United States Patent
Bambi et al.

(10) Patent No.: US 9,402,499 B2
(45) Date of Patent: Aug. 2, 2016

(54) PORTAFILTER FOR ESPRESSO COFFEE MACHINES

(75) Inventors: Piero Bambi, Sesto Fiorentino (IT); Paola Lorenzi, Florence (IT)

(73) Assignee: LA MARZOCCO, SRL, Florence (IT)

( * ) Notice: Subject to any disclaimer, the term of this patent is extended or adjusted under 35 U.S.C. 154(b) by 616 days.

(21) Appl. No.: 13/503,648

(22) PCT Filed: Oct. 25, 2010

(86) PCT No.: PCT/IB2010/002720
§ 371 (c)(1),
(2), (4) Date: Jul. 9, 2012

(87) PCT Pub. No.: WO2011/048485
PCT Pub. Date: Apr. 28, 2011

(65) Prior Publication Data
US 2012/0266754 A1    Oct. 25, 2012

(30) Foreign Application Priority Data
Oct. 23, 2009    (IT) .............................. PO20090010 U

(51) Int. Cl.
A47J 31/06    (2006.01)
A47J 31/44    (2006.01)
A47J 31/46    (2006.01)

(52) U.S. Cl.
CPC .......... *A47J 31/0663* (2013.01); *A47J 31/4464* (2013.01); *A47J 31/46* (2013.01)

(58) Field of Classification Search
None
See application file for complete search history.

(56) References Cited

U.S. PATENT DOCUMENTS

| | | | | |
|---|---|---|---|---|
| 4,204,465 A | * | 5/1980 | Knecht | 99/293 |
| 4,429,623 A | * | 2/1984 | Illy | 99/295 |
| 4,644,856 A | * | 2/1987 | Borgmann | 99/295 |
| 4,739,697 A | * | 4/1988 | Roberts | A47J 31/06 210/474 |
| 7,228,790 B2 | * | 6/2007 | Chen et al. | 99/302 R |
| 8,528,743 B1 | * | 9/2013 | Rains | 210/459 |
| 2005/0193892 A1 | * | 9/2005 | Rahn et al. | 99/279 |

FOREIGN PATENT DOCUMENTS

| | | |
|---|---|---|
| EP | 0070403 A1 | 1/1983 |
| EP | 1563774 A1 | 8/2005 |
| WO | 2008/004072 A2 | 1/2008 |
| WO | 2008/058633 A2 | 5/2008 |

OTHER PUBLICATIONS

International Search Report dated Apr. 28, 2011 for PCT/IB2010/002720, 6 pp.
Written Opinion dated Apr. 23, 2012 for PCT/IB2010/002720, 5 pp.

* cited by examiner

*Primary Examiner* — Benjamin Kurtz
(74) *Attorney, Agent, or Firm* — Hart IP Law & Strategies, LLC

(57) ABSTRACT

In an improved filter holder for espresso coffee machines, the spout (22) is applied to the hollow upper member (10) of the filter holder by a snap fitting and the bottom (14) of the upper member (10) is provided on the outside of it with a relief shape (30), the edge (32) of which forms a stable supporting surface for pressing the ground coffee powder. The filter holder is made entirely of polished stainless steel.

12 Claims, 2 Drawing Sheets

PORTAFILTER FOR ESPRESSO COFFEE MACHINES

CROSS-REFERENCES TO RELATED APPLICATIONS

This application is a National Stage of PCT Application No. PCT.IB2010/002720 filed Oct. 25, 2010, which claims the benefit of Italian Application No. PO2009U000010 filed Oct. 23, 2009; and both of said applications are incorporated herein by reference.

TECHNICAL FIELD

This invention relates to an improved filter holder for espresso coffee machines.

PRIOR ART

As is known, filter holders for espresso coffee machines consist of a substantially cylindrical, hollow upper member equipped with a filter and designed to contain the ground coffee powder, and a frustoconical lower member, also hollow, equipped with a single or double spout for delivering the brewed coffee.

At present, the frustoconical lower member equipped with the spout is associated with the bottom of the hollow upper member by a helical coupling (basically, a screw coupling) which makes it awkward to remove the spout when it has to be cleaned or substituted.

Further, the hollow upper member is rounded at the bottom, making it unstable when rested on a surface to press the ground coffee powder in it. This creates a serious inconvenience for a coffee machine operator who often has to perform the pressing operation very frequently, even hundreds of times in the space of just a few hours.

DISCLOSURE OF THE INVENTION

This invention has for an aim to propose a filter holder for espresso coffee machines which is particularly effective, practical to apply and simple to make and which overcomes the above mentioned disadvantages.

The above aims are achieved in a filter holder according to the accompanying claims. Experts in the trade will better appreciate the aims and technical advantages of the invention from the following description with reference to the accompanying drawings illustrating a preferred non-limiting embodiment of it.

PREFERRED EMBODIMENTS OF THE INVENTION

Figure 1:
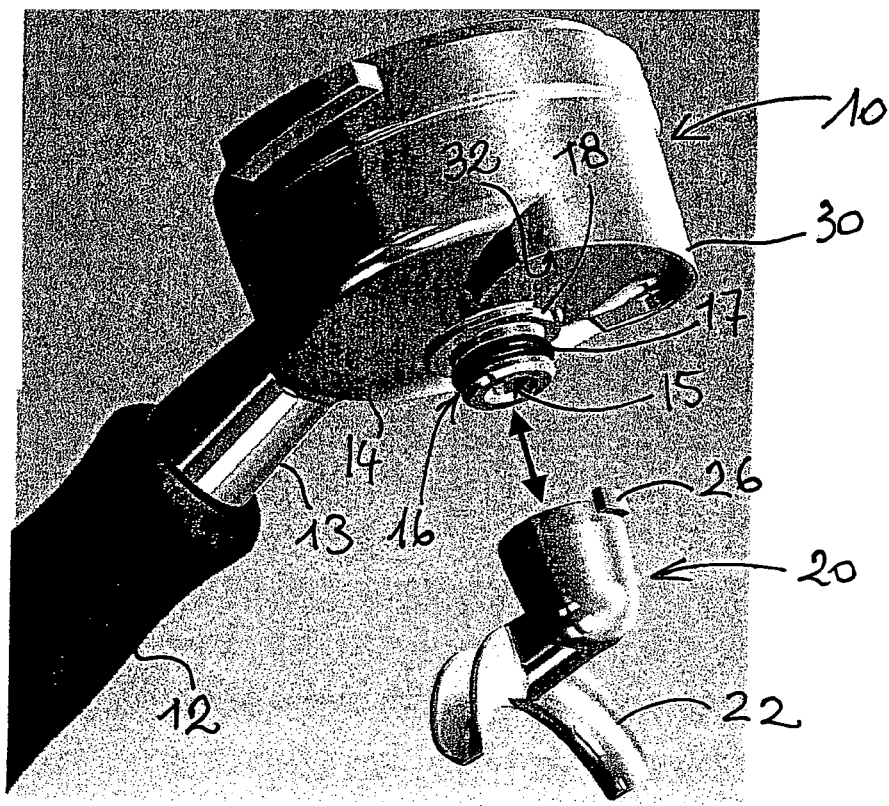
FIG. 1 shows a perspective view of a filter holder according to the invention, with the two component parts disassembled.
Figure 2:
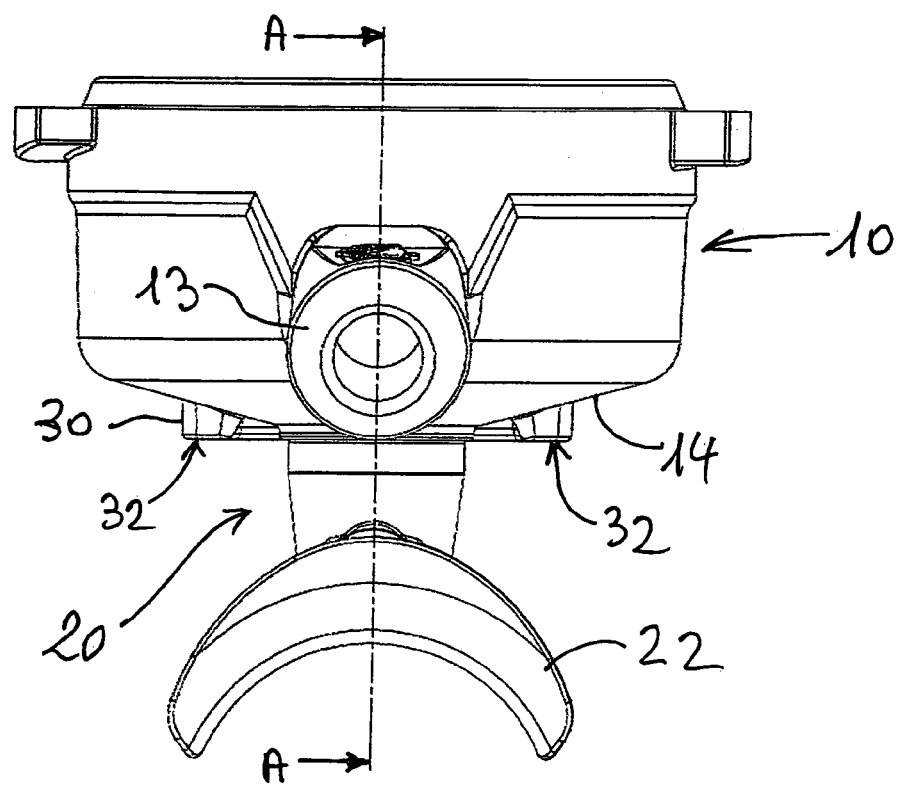
FIG. 2 shows a front view (from the handle side) of the filter holder with the components assembled.
Figure 3:
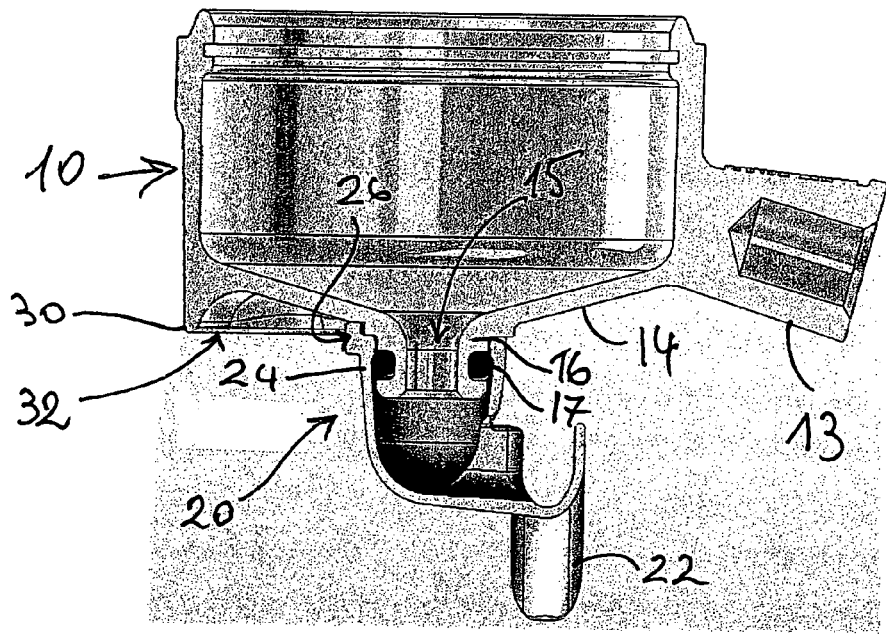
FIG. 3 is a cross section of the filter holder along the line A-A shown in FIG. 2.
Figures 4A, 4B:
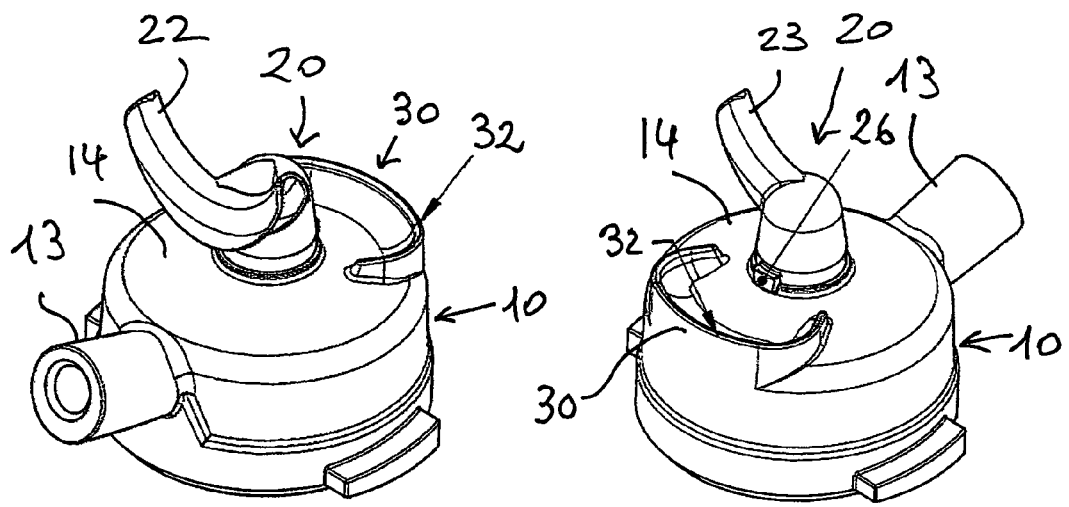
FIGS. 4a and 4b illustrate the filter holder with a double spout and a single spout, respectively.

With reference to the drawings, a filter holder for espresso coffee machines comprises a substantially cylindrical, hollow upper member 10 equipped with a handle 12 associated with a lateral protrusion of it 13.

The bottom of the upper member 14 has associated with it a frustoconical, hollow lower member 20 equipped with a double spout 22 or a single spout 23. The cavities of the upper member 10 and of the lower member 20 are in communication with each other through a hole 15 made in the bottom wall 14 of the upper member.

The upper member 10 is designed to receive a filter and the ground coffee powder (not illustrated) while the brewed coffee is delivered through the lower member 20 and spout 22.

According to the invention, the bottom wall 14 of the upper member is provided, at the hole 15, with a protrusion 16 that is externally shaped in such a way as to form a male connector for a snap fitting with the lower member 20 (whose inlet 24 is shaped to form a female connector). An O-ring seal 17 is seated in a housing formed in the male connector 16.

To prevent rotation of the spout 22, the inlet of the lower member 20 is provided with a tooth 26 designed to fit into a matching slot 18 formed on the outside surface of the bottom 14 of the upper member 10.

It is evident that the proposed solution allows the spout 22 to be quickly fitted or removed to/from the filter holder without in any way altering its functionality when it has to be cleaned or replaced.

A further improvement devised for filter holders for espresso coffee machines consists of a relief shape 30 made on the outside of the bottom 14 of the upper member 10.

As clearly illustrated in the drawings, the edge 32 of the shape 30 forms a stable supporting surface which makes it much easier and more practical, compared to the filter holders used up to now, for the operator to press the ground coffee powder.

Another feature of the filter holder that forms the subject-matter of this patent application is that it is made entirely of polished stainless steel, which guarantees maximum hygiene and makes it lighter in weight than existing filter holders.

The embodiment described above is provided purely by way of an example and it will be understood that other equivalent embodiments are imaginable without departing from the scope of protection of the invention.

The invention claimed is:

1. A filter holder for espresso coffee machines comprising:
a substantially cylindrical, hollow upper member and a frustoconical lower member equipped with a spout, the cavities of the upper member and of the lower member being in communication with each other through a hole made in the bottom wall of the upper member,
wherein the filter holder is comprised of the bottom wall of the upper member, at the hole, with a protrusion that is externally shaped in such a way as to form a male connector for a snap fitting with the lower member whose inlet is shaped to form a female connector,
a relief shape on the bottom wall of the upper member, the edge of which forms a stable supporting surface, the relief shape is a curved continuous structure that comprises a first section, a central section, and a second section, the central section being disposed along a perimeter of the bottom wall of the upper member, the first section and the second section, each forming an arc that curves away from the perimeter and extends toward the center of the bottom wall, and
wherein the spout extends in a downward direction a distance that is greater than the distance the relief shape extends in a downward direction from the bottom wall of the upper member.

2. The filter holder according to claim 1, characterized in that an O-ring seal is seated in a housing formed in the outside wall of the protrusion.

3. The filter holder according to claim 1 wherein a tooth is provided at the inlet of the lower member and wherein said matching slot is formed on the outside surface of the bottom of the upper member.

4. The filter holder according to claim 1 comprised entirely of polished stainless steel.

5. The filter holder according to claim 1, further comprising:
a handle attached to a side of the substantially cylindrical, hollow upper member, to enable a person to grip the filter holder.

6. The filter holder of claim 5 wherein the handle is attached to the side of the substantially cylindrical, hollow upper member at a location that is substantially radially opposed to the relief shape.

7. A filter holder for espresso coffee machines, comprising:
a substantially cylindrical, hollow upper member and a frustoconical lower member equipped with a spout and associated with the upper member, the cavities of the upper member and of the lower member being in communication with each other through a hole made in the bottom wall of the upper member,
wherein the lower member is provided with a tooth extending in a nonparallel direction away from the hole of the upper member, wherein the tooth is designed to fit into a matching slot formed on the upper member so that rotation of the spout with respect to the upper member is prevented,
wherein the filter holder is comprised of a relief shape on the bottom wall of the upper member, the edge of which forms a stable supporting surface, the relief shape is a curved continuous structure that comprises a first section, a central section, and a second section, the central section being disposed along a perimeter of the bottom wall of the upper member, the first section and the second section, each forming an arc that curves away from the perimeter and extends toward the tooth; and
wherein the spout extends in a downward direction a distance that is greater than the distance the relief shape extends in a downward direction from the bottom wall of the upper member.

8. The filter holder according to claim 7, further comprising:
a handle attached to a side of the substantially cylindrical, hollow upper member, to enable a person to grip the filter holder.

9. The filter holder of claim 8 wherein the handle is attached to the side of the substantially cylindrical, hollow upper member at a location that is substantially radially opposed to the relief shape.

10. A filter holder for espresso coffee machines, comprising;
a substantially cylindrical, hollow upper member and a frustoconical lower member equipped with a spout, the cavities of the upper member and of the lower member being in communication with each other through a hole made in the bottom wall of the upper member,
wherein the filter holder further comprises a relief shape projecting from the bottom wall of the upper member, wherein an edge of the relief shape forms a stable supporting surface, wherein the relief shape is a curved continuous structure that comprises a first section, a central section, and a second section, the central section being disposed along a perimeter of the bottom wall of the upper member, the first section and the second section, each forming an arc that curves away from the perimeter toward the center of the bottom wall, and
wherein the spout extends in a downward direction a distance that is greater than the distance the relief shape extends in a downward direction from the bottom wall of the upper member.

11. The filter holder according to claim 10, further comprising:
a handle attached to a side of the substantially cylindrical, hollow upper member, to enable a person to grip the filter holder.

12. The filter holder of claim 11 wherein the handle is attached to the side of the substantially cylindrical, hollow upper member at a location that is substantially radially opposed to the relief shape.

* * * * *